US012686257B2

(12) United States Patent
　　Lechthaler et al.

(10) Patent No.: US 12,686,257 B2
(45) Date of Patent: Jul. 21, 2026

(54) HYBRID DRIVE SYSTEM FOR A MOTOR VEHICLE

(71) Applicant: Mercedes-Benz Group AG, Stuttgart (DE)

(72) Inventors: Thomas Lechthaler, Stuttgart (DE); Kai Heukelbach, Koengen (DE); Bernhard Ziegler, Rechberghausen (DE); Jan Velthaus, Stuttgart (DE); Lukas Rube, Pluederhausen (DE); Bernd Koppitz, Winterbach (DE)

(73) Assignee: Mercedes-Benz Group AG, Stuttgart (DE)

( * ) Notice: Subject to any disclaimer, the term of this patent is extended or adjusted under 35 U.S.C. 154(b) by 272 days.

(21) Appl. No.: 18/294,446

(22) PCT Filed: Jul. 26, 2022

(86) PCT No.: PCT/EP2022/070956
§ 371 (c)(1),
(2) Date: Feb. 1, 2024

(87) PCT Pub. No.: WO2023/011988
PCT Pub. Date: Feb. 9, 2023

(65) Prior Publication Data
US 2024/0336127 A1 　　Oct. 10, 2024

(30) Foreign Application Priority Data
Aug. 2, 2021 　(DE) ..................... 10 2021 003 963.7

(51) Int. Cl.
B60K 6/387 　　(2007.10)
B60K 6/24 　　(2007.10)
B60K 6/48 　　(2007.10)

(52) U.S. Cl.
CPC ................ B60K 6/387 (2013.01); B60K 6/24 (2013.01); B60K 6/48 (2013.01)

(58) Field of Classification Search
CPC ............ B60K 6/387; B60K 6/24; B60K 6/48
See application file for complete search history.

(56) References Cited

U.S. PATENT DOCUMENTS 10,183,567 B2 * 　1/2019 　Suyama ................... B60K 6/26
10,875,399 B2 　12/2020 　Heeke et al.
2017/0210315 A1 　7/2017 　Nakajima et al.

FOREIGN PATENT DOCUMENTS

DE 　　10 2011 015 376 A1 　10/2012
DE 　　10 2017 219 962 A1 　5/2019
(Continued)

OTHER PUBLICATIONS

International Search Report (PCT/ISA/210) issued in PCT Application No. PCT/EP2022/070956 dated Oct. 21, 2022 (2 pages).
(Continued)

*Primary Examiner* — James A Shriver, II
*Assistant Examiner* — Nicholas R. Kandas
(74) *Attorney, Agent, or Firm* — Crowell & Moring LLP

(57) ABSTRACT

A hybrid drive system for a motor vehicle has an input shaft via which torques provided by an internal combustion engine can be introduced into the hybrid drive system, a drive shaft disposed coaxially with the input shaft, an electric engine which has a stator and a rotor, and a torque converter which has an impeller, a converter cover connected to the impeller in a manner fixed against rotation, and a converter hub which is connected to the converter cover in a manner fixed against rotation. The converter hub is connected to the rotor in a manner fixed against rotation. The system further has a separable clutch having a disc pack, a clutch chamber in which the disc pack is received, an operating piston, and an associated operating chamber. Via
(Continued)

the separable clutch the converter hub can be connected to
the input shaft in a manner fixed against rotation.

6 Claims, 3 Drawing Sheets

(56)                    References Cited

FOREIGN PATENT DOCUMENTS

| | | | |
|---|---|---|---|
| DE | 10 2018 002 019 A1 | 9/2019 | |
| DE | 102019123491 A1 * | 4/2020 | ............... B60K 6/36 |
| DE | 10 2019 001 957 A1 | 9/2020 | |

OTHER PUBLICATIONS

German-language Search Report issued in German Application No.
10 2021 003 963.7 dated Apr. 6, 2022, with Statement of Relevancy
(7 pages).
U.S. Patent Application, "Hybrid Drive System for a Motor Vehicle",
filed Feb. 1, 2024, Inventor Kai Heukelbach et al.

* cited by examiner

HYBRID DRIVE SYSTEM FOR A MOTOR VEHICLE

BACKGROUND AND SUMMARY OF THE INVENTION

The invention relates to a hybrid drive system for a motor vehicle, in particular for a motor car.

Such a hybrid drive system for a motor vehicle can for example be taken as known from DE 10 2019 001 957 A1. The hybrid drive system has an input shaft which is rotatably mounted around an axis of rotation. Torques which can be provided by an internal combustion engine can be introduced into the hybrid drive system via the input shaft. The hybrid drive system additionally comprises an output drive shaft arranged coaxially with the input shaft, and an electric engine, which has a stator and a rotor. The hybrid drive system additionally comprises a torque converter, which has an impeller, a converter cover connected to the impeller in a manner fixed against rotation and a converter hub which is connected to the converter cover in a manner fixed against rotation, which converter hub is connected to the rotor in a manner fixed against rotation. The hybrid drive system additionally comprises a separable clutch, which has a disc pack, a clutch chamber, an operating piston and an associated operating chamber. The disc pack is received in the clutch chamber. By means of the separable clutch, the converter hub, which is also simply described as a hub, is connected to the input shaft in a manner fixed against rotation.

Furthermore, at least one feeding conduit is provided, which can be flowed through by oil and by means of which at least a part of the oil flowing through the feeding conduit can be introduced into the operating chamber as operating oil to operate the operating piston. In addition, at least one cooling conduit is provided, which is also described as a cooling oil conduit. Via the cooling conduit, the separable clutch and the electric engine can be supplied with a cooling oil flowing through the cooling conduit.

In addition, DE 10 2018 002 019 A1 discloses a transmission lubrication valve. A hybrid motor vehicle device is known from DE 10 2011 015 376 A1.

The object of the invention is to develop a hybrid drive system of the kind specified in the introduction, which can implement a particularly advantageous cooling particularly easily.

In order to develop a hybrid drive system of the kind specified herein such that a particularly advantageous cooling can be particularly easily implemented, at least one control slide is provided according to the invention, by means of which a flow volume of the cooling oil flowing to the separable clutch and the electric engine can be adjusted. The control slide has a hydraulic active surface, wherein in order to displace the control slide, and thus to adjust the flow volume of the cooling oil, a hydraulic liquid can be applied to the hydraulic active surface of the control slide. According to the invention, at least a part of the oil flowing through the feeding conduit is used as the hydraulic liquid which can be applied to the hydraulic active surface of the control slide, in order thus to displace the hydraulic control slide, and thus to adjust the flow volume, such that at least a part of the oil flowing through the feeding conduit can be applied to the hydraulic active surface of the control slide via the feeding conduit. In other words, the hydraulic active surface of the control slide is hydraulically connected to the feeding conduit also described as an oil feeding channel or feeding channel. This means that at least a part of the oil flowing through the feeding conduit can flow out of the feeding conduit and be applied, i.e., flow to, in particular directly, the active surface, whereby the control slide can be displaced, in particular relative to a component, and the flow volume can thus be adjusted. A supply of the electric engine and of the separable clutch with the cooling oil which is particularly as required can thus be implemented, such that the separable clutch and the electric engine can be cooled particularly as required.

In an advantageous embodiment of the invention, a second control slide is provided, of which the second hydraulic active surface is connected in parallel with the first active surface of the first control slide by flow technology, and to the second hydraulic active surface of which at least a part of the oil flowing through the feeding conduit can be applied via the feeding conduit, whereby the second control slide can be displaced and thus, in particular the flow volume of the cooling oil can be adjusted. At least two control slides which are connected in parallel are thus provided, wherein both control slides respectively have an active surface which is hydraulically connected to the feeding conduit. The flow volume can thus be adjusted particularly as required.

Preferably, a first spring device, by means of which the first control slide can be displaced is assigned to the first control slide, and a second spring device, by means of which the second control slide can be displaced, is assigned to the second control slide, wherein the spring devices have different spring characteristic curves. In the event of a pressure shared by the active surfaces, acting in the feeding conduit and/or on the active surfaces, one control slide is shifted further than the other, whereby for example, a conduit part, via which the electric engine and the separable clutch, in particular its disc pack, can be supplied with the cooling oil, is released further by one control slide than a second conduit part, via which the electric engine and the separable clutch can be provided with the cooling oil, is released by the other control slide. It is conceivable that the conduit parts are parts of the cooling conduit also described as a cooling oil conduit, in particular such that the conduit parts are connected upstream of a longitudinal region fluidically connected to the two conduit parts, so that the longitudinal region is a further part of the cooling conduit shared by the conduit parts. In other words, the longitudinal region can be supplied with the respective cooling oil flowing through the respective conduit part via the conduit parts, such that the electric engine and the separable clutch can be supplied with the cooling oil via the longitudinal region and the conduit parts. In particular, the flow volume flowing through the longitudinal region can be adjusted via the respective control slide, which flow volume is in particular formed from a first flow volume part of the cooling oil flowing through the first conduit part and a second flow volume part of the cooling oil flowing through the second conduit part. For example, the conduit parts, which are for example transverse holes, differ in their respective flow cross-sections that can be flowed through by the cooling oil, and thus, for example, in their diameters. The respective conduit part is for example designed as a hole, such that the respective diameter is also described as a hole diameter. The flow volume can thus be adjusted particularly as required.

In a first switch position of the control slide for pressures in the feeding conduit lower than a pre-determined limit value or close to zero, a cooling oil conduit having a large cross-section or the conduit part having a larger flow cross-section can preferably be switched.

In a second switch position of the control slide for pressures in the feeding conduit lower than a pre-determined limit value and higher than a pre-determined second limit value, both cooling oil conduits or both conduit parts can preferably be substantially switched off.

It has further proved particularly advantageous if the torque converter has an interior for receiving converter oil which is at least partially and directly delimited by the impeller, wherein the cooling conduit, i.e., at least one for example further longitudinal region of the cooling conduit, is designed as a direct connecting conduit formed between the interior of the torque converter and the clutch chamber of the separable clutch and running into the converter hub, via which cooling conduit the disc pack of the separable clutch and the electric engine can be provided with the converter oil as the cooling oil from the interior of the torque converter. It is in particular conceivable that the further longitudinal region of the cooling conduit is arranged upstream of the conduit parts and upstream of the first longitudinal region.

The following facts are in particular the basis of the invention:

In a hybrid system for example designed as a P2 hybrid system or as a hybrid system in P2 arrangements, in which the internal combustion engine with the electric engine is arranged on a transmission input, the separable clutch, which is also described as K0, is used to decouple the internal combustion engine from the remaining drive train during electric driving. In order to be able to start the internal combustion engine as required, it is advantageous if the separable clutch can be power shifted, so that the internal combustion engine can be tow-started via the separable clutch also simply described as a clutch. In an electric journey, it is additionally advantageous to cool the rotor and winding heads of the electric engine to achieve a particularly high continuous power of the electric engine. It is thus in particular conceivable that the winding heads and/or the rotor of the electric engine can be supplied with the cooling oil, and thereby cooled. In particular when towing the internal combustion engine and during the electric driving, it is advantageous to provide the electric engine, in particular the rotor and the winding heads, and advantageously also the separable clutch, in particular the disc pack, with cooling oil, such that advantageous operating modes can be realized, in particular in the form of towing the internal combustion engine and electric driving. The invention makes it possible to feed cooling oil as required with simultaneously minimal construction complexity, in particular for an existing power unit. In particular, the invention makes it possible to remove cooling oil from the interior also described as a converter interior, and to feed cooling oil via integration near to the axle of a conduit pattern, in particular into the converter hub also described as a hub or torque converter hub. In addition, a control unit for depicting two, three or, by contrast, multi-region characteristic maps of the flow volume also described as a cooling oil flow volume, can be implemented, in particular integrated into the torque converter hub close to the axle, in particular by using one, two, or, by contrast, several control slides. It is further possible to control the multi-region characteristic maps also simply described as characteristic maps by controlling spring-loaded control slides via the pressure, also described as a pressure level, of the operating oil which is used to operate the separable clutch. By depicting different spring characteristic curves or spring rigidities of the spring devices, different characteristic maps can be controlled per control slide. An additional variable cooling oil quantity (correspondingly controlled in the characteristic map) is further possible via at least free control of a pressure of the converter oil also described as converter interior pressure and present in the interior. Via the embodiment described, a complex conduit pattern in a driving head housing is not required to feed the cooling oil and supply a control unit. A quantity of the cooling oil is preferably varied via a control unit preferably integrated into the torque converter hub, the control unit comprising at least the first control slide, preferably both control slides. Because rotating oil passages, sealed in a complex manner, are not required, pressure and friction losses can be kept particularly low. Via the invention, costs can be reduced in comparison with conventional solutions, and installation space advantages can be implemented. Because the separable clutch and the electric engine can be supplied with the cooling oil via the rotating torque converter hub, a particularly advantageous distribution of the cooling oil is guaranteed.

Further advantages, features and details of the invention result from the following description of preferred exemplary embodiments and with reference to the drawings. The features and combinations of features previously specified in the description and the features and combinations of features specified in the following description of figures and/or shown only in the figures can be used not only in the specified combination, but also in other combinations or in isolation without leaving the scope of the invention.

DETAILED DESCRIPTION OF THE DRAWINGS

Figure 1:
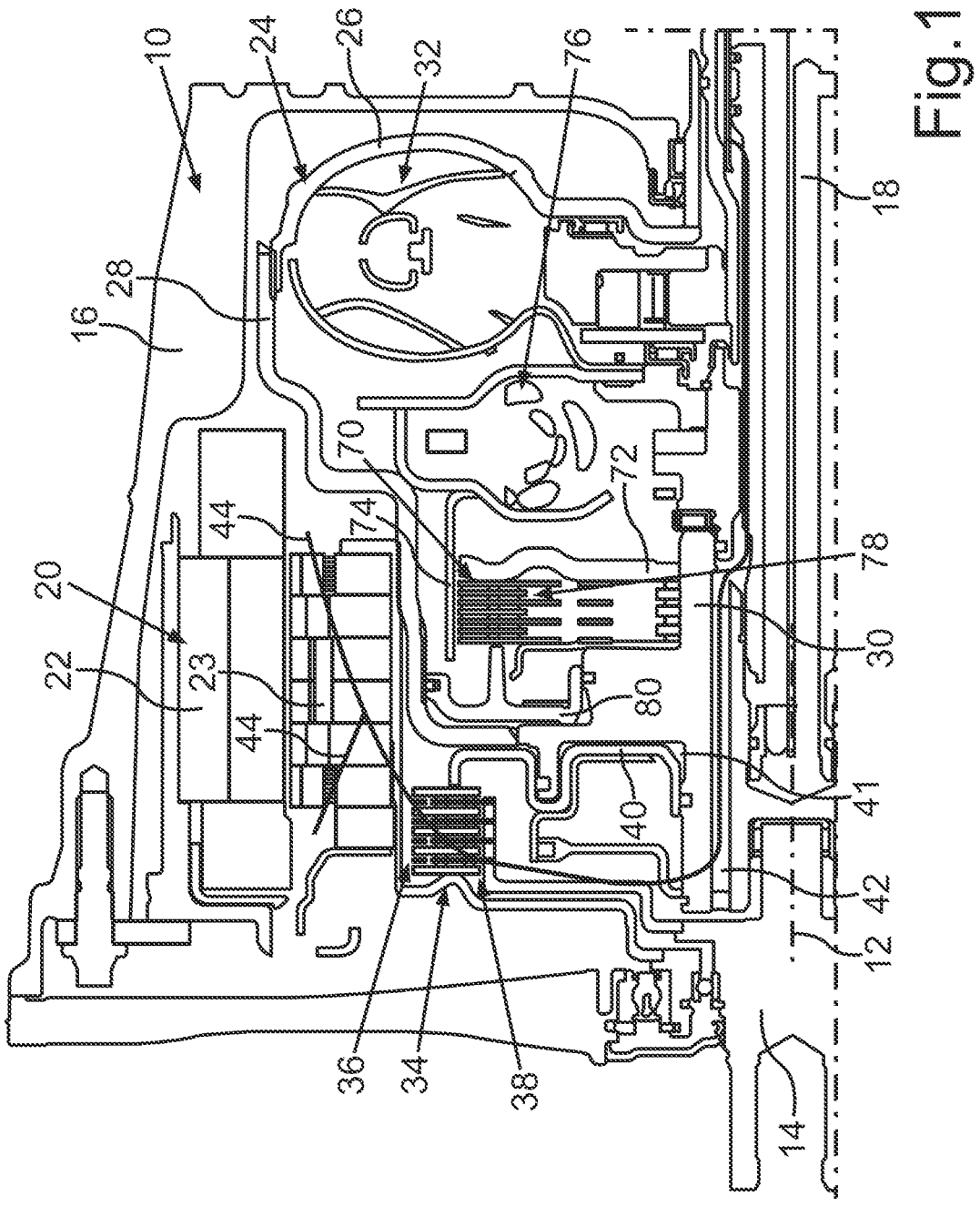
FIG. 1 shows a section of a schematic and sectional side view of a hybrid drive system for a motor vehicle, in particular for a motor car.

In the figures, identical or functionally identical elements are provided with identical reference numerals.

FIG. 1 show a section of a hybrid drive system 10 also described as a power unit or designed as a power unit for a motor vehicle, in particular for a motor car, in a schematic and sectional side view. The hybrid drive system 10 has an input shaft 14 which is rotatably mounted around an axis of rotation 12 and which can be rotated around the axis of rotation 12 relative to a housing 16 of the hybrid drive system 10. Torques which can be provided by an internal combustion engine (not depicted in the figures) can be introduced into the hybrid drive system 10 via the input shaft 14. The internal combustion engine can optionally be a component of the hybrid drive system 10. In its completely produced state, the motor vehicle has the hybrid drive system 10 and the internal combustion engine, whereby the motor vehicle can be driven by means of the internal combustion engine.

The hybrid drive system 10 comprises an output drive shaft 18 which is arranged coaxially with the input shaft 14 and can be rotated around the axis of rotation 12 relative to the housing 16. Via the output drive shaft 18, the hybrid drive system 10 can provide torques, which are also described as drive moments and for example can be introduced into a transmission (not depicted in FIG. 1) of the drive train of the motor vehicle. The hybrid drive system 10 further comprises an electric engine 20, which has a stator 22 and a rotor 23. The rotor 23 is arranged coaxially with the input shaft 14 and coaxially with the output drive shaft 18, and can thus be rotated around the axis of rotation 12 relative to the housing 16 and relative to the stator 22. Via its rotor 23, the electric engine 20 can provide torques, in particular for driving the motor vehicle purely electrically. The previously specified drive torques, which can be provided by the hybrid drive system 10 via the output drive shaft 18, result for example from the torques provided by the internal combustion engine and/or the electric engine 20. In particular, the rotor 23 can be driven by means of the stator 22, and can thus be rotated around the axis of rotation 12 relative to the housing 16.

The hybrid drive system 10 additionally comprises a torque converter 24, which is presently designed as a hydrodynamic torque converter. The torque converter 24 has an impeller 26, a converter cover 28 connected to the impeller 26 in a manner fixed against rotation and a converter hub 30, also simply described as a hub or torque converter hub, which is connected to the converter cover 28 in a manner fixed against rotation. In addition, the converter hub 30 is connected to the rotor 23 in a manner fixed against rotation. In the exemplary embodiment shown in FIG. 1, the converter hub 30 is connected to the rotor 23 in a manner fixed against rotation via the converter cover 28, such that the rotor 23 is connected to the converter cover 28 in a manner fixed against rotation, and the converter cover 28 is connected to the converter hub 30 in a manner fixed against rotation. The torque converter 24 further has an interior 32, also described as a converter interior, which is at least partially and directly delimited by the impeller 26. In the interior 32 (converter interior), a converter oil also described as lubricating oil or oil can be received. In other words, oil, i.e., converter oil, is for example received in the converter interior during an operation of the hybrid drive system 10.

The hybrid drive system 10 additionally comprises a separable clutch 34, also described as K0 or labelled K0, which has a disc pack 36 and a clutch chamber 38, in which the disc pack 36 is received. The separable clutch 34 designed as a disc clutch additionally comprises an operating piston 40, which can be moved, in particular in the axial direction of the separable clutch 34, relative to the disc pack 36, in particular translationally. The separable clutch 34 is arranged coaxially with the input shaft 14 and coaxially with the output drive shaft 18, such that the axial direction of the separable clutch 34 coincides with the axial direction of the input shaft 14 or of the output drive shaft 18. The separable clutch 34 further has an operating chamber 41 belonging to the operating piston 40. A hydraulic fluid in the form of an operating oil can be introduced into the operating chamber 41, whereby, for example, the operating oil can be applied to the operating piston 40 at least indirectly, in particular directly, thereby moving the operating piston from a decoupled position into a coupled position, in particular in the axial direction of the separable clutch 34 and/or relative to the disc packet 36. By applying the operating oil to the operating piston 40, the operating piston 40 and thus the separable clutch 34 are operated, in particular such that the separable clutch 34 is closed. In particular, by operating the operating piston 40, i.e., by applying the operating oil to the operating piston 40, the operating piston 40 can be moved from a decoupled position into a coupled position, in particular in the axial direction of the separable clutch 34 and/or relative to the disc pack 36. The disc pack 36 can thus be pressed together by means of the operating piston 40, whereby for example the initially open separable clutch 34 can be closed. If the separable clutch 34 is open, the converter hub 30 (hub) can be rotated around the axis of rotation 12 relative to the input shaft 14, such that the input shaft 14 is decoupled from the converter hub 30 or vice versa. If, however, the separable clutch 34 is closed, the converter hub 30 is connected to the input shaft 14 by means of the separable clutch 34 in a manner fixed against rotation, such that the converter hub 30 can then be driven via the separable clutch 34 by the input shaft 14, and thus by the internal combustion engine. A transition position of the operating piston 40 is also described as a touchpoint or kissing point of the separable clutch 34. In the touchpoint, the operating piston 40 was moved from the decoupled position into the or in the direction of the coupled position, whereby in the touchpoint the separable clutch 34 is currently still slightly open, such that currently no torques are transmitted between the converter hub 30 and the input shaft 14 via the separable clutch 34.

During an electric journey of the motor vehicle, the separable clutch 34 is for example open, such that via its rotor 23, the electric engine 20 can drive the converter cover 28, and additionally the converter hub 30 and thus the motor vehicle, electrically, in particular purely electrically without dragging the internal combustion engine, in particular its output drive shaft for example designed as a crankshaft along with it. For example, in order to start, i.e., to tow, the previously deactivated internal combustion engine by means of the electric engine 20, the separable clutch 34 is closed, in particular via the touchpoint. Via its rotor 23, the electric engine 20 can then specifically drive the converter cover 28, and additionally the converter hub 30, and thus drive the input shaft 14 and thus the internal combustion engine or its output drive shaft via the separable clutch 34.

Figure 2:
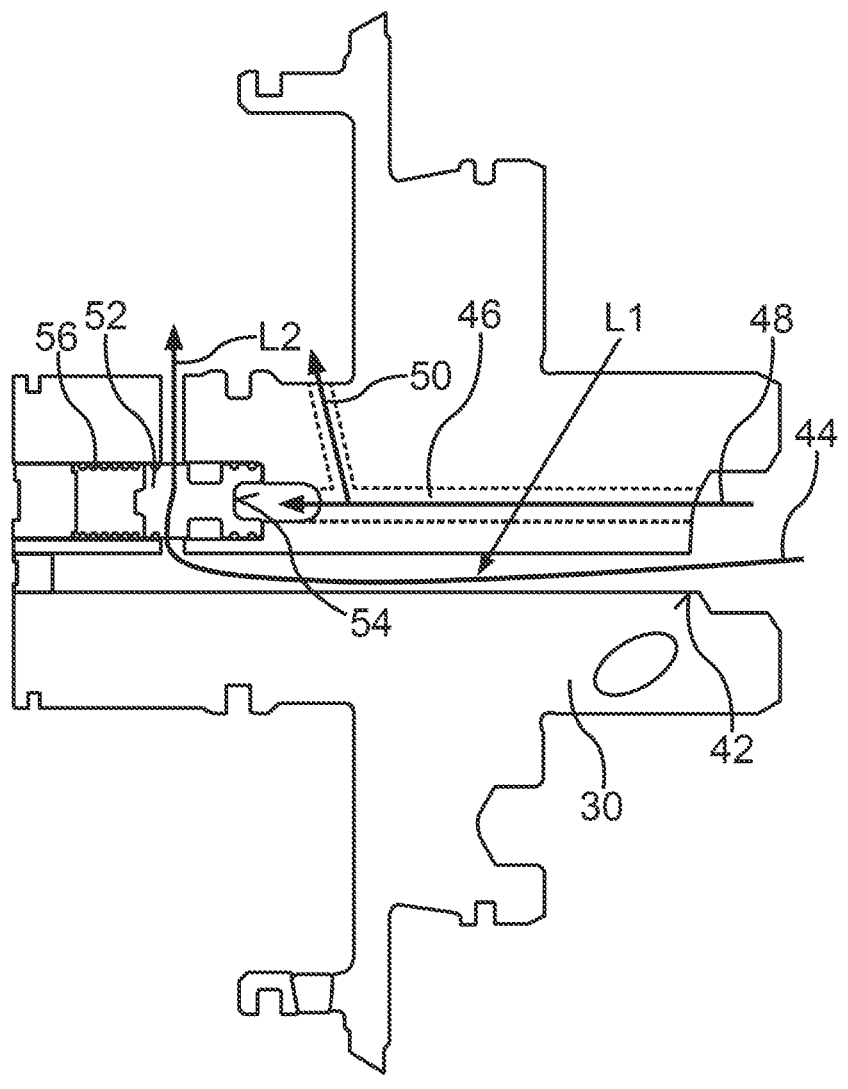
FIG. 2 shows a section of a schematic and sectional side view of a first embodiment of the hybrid drive system.

To be able to implement a particularly advantageous cooling of the electric engine 20 and of the disc pack 36 in a particularly easy manner, the hybrid drive system 10 has a cooling oil conduit 42 (FIG. 2) designed or able to be designed as a direct connecting conduit between the interior 32 of the torque converter 24 and the clutch chamber 38 of the separable clutch 34, and running at least partially into the converter hub 30 and also described as a cooling conduit, via which cooling oil conduit the disc pack 36 of the separable clutch 34 and the electric engine 20, in particular the rotor 23 and/or the winding heads of the electric engine 20, can be supplied with the converter oil as cooling oil from the interior 32 of the torque converter 24. In FIG. 1, a flow of the converter oil used as cooling oil from the converter interior through the cooling oil conduit 42 and to the disc pack 36 and the electric engine 20 is depicted by arrows 44. In FIG. 2, a first longitudinal region L1 of the cooling oil conduit 42 can be seen.

It can also be seen particularly clearly from FIG. 2 that the hybrid drive system 10 has at least one feeding conduit 46 which can be flowed through by oil and at least partially runs into the converter hub 30, by means of which feeding conduit at least a part of the oil flowing through the feeding conduit 46 and depicted in FIG. 2 by an arrow 48 can be introduced into the operating chamber 41, which is depicted in FIG. 2 by an arrow 50. The feeding conduit 46 is also described as a pressure conduit or K0 pressure conduit, because the oil flowing through the feeding conduit 46 is used as the previously specified operating oil to operate the operating piston 40.

In particular during the previously specified operation of the hybrid drive system 10, there is a pressure also described as internal pressure or converter interior pressure in the converter interior, in particular a pressure of the converter oil received in the converter interior.

To be able to provide the disc pack 36 and the electric engine 20 with the latter particularly as required, the hybrid drive system 10, as depicted in FIG. 2 using a first embodiment of the hybrid drive system 10, has at least one control slide 52, which, in the first embodiment, is arranged, in particular completely, in the converter hub 30, and can be displaced relative to the converter hub 30. By means of the control slide 52, a flow volume of the oil flowing through the cooling oil conduit 42, and thus of the cooling oil, can be adjusted. In other words, a flow volume of the oil flowing through the cooling oil conduit 42 flowing through the cooling oil conduit 42 can be adjusted by means of the control slide 52. In order to adjust the flow volume of the cooling oil, the control slide 52 is shifted relative to the converter hub 30. To displace the control slide 52, and thus to adjust the flow volume, at least a part of the oil flowing through the feeding conduit 46 is applied to a hydraulic active surface 54 of the control slide 52 via the feeding conduit 46. This means that at least a part of the oil flowing through the feeding conduit 46 can be diverted from the feeding conduit 46 and guided to the active surface 54, to which the diverted oil from the feeding conduit 46 can be applied, in particular directly, whereby the control slide 52 can be displaced, in particular from a first switch position into a second switch position. Via the control slide 52, a second longitudinal region L2 of the cooling oil conduit 42 arranged or running downstream of the longitudinal region L1 and downstream of the control slide 52 can be supplied with cooling oil from the longitudinal region L1, and thus from the converter interior, such that in particular a flow volume of the cooling oil flowing through the longitudinal region L2 can be adjusted by means of the control slide 52. It can be seen that the control slide 52 is a slide valve, by means of which the flow volume can be adjusted. In particular, the cooling oil or the flow volume can be controlled or regulated, so to speak, by means of the control slide 52.

It can be seen from FIG. 2 that the control slide 52 is a spring-loaded control slide. This means that a spring device 56 presently designed as a mechanical spring is assigned to the control slide 52, by means of which spring device the control slide 52 can be displaced, in particular from the second switch position into the first switch position. If the control slide 52 is displaced by means of the oil from the feeding conduit 46 from the first switch position into the second switch position, then the spring device 56 is thus tensioned, in particular compressed. The spring device 56 thus provides a spring force, by means of which, in particular if a pressure of the oil from the feeding conduit 46 acting on the active surface 54 is reduced, the control slide 52 can be displaced back, i.e., can be displaced from the second switch position into the first switch position. In the first embodiment shown in FIG. 2, the spring device 56 thus functions as a return spring for the control slide 52.

For example, the control slide 52 can be moved against the spring device 56, i.e., against the spring force which is or can be provided by the spring device 56, into the specified switch positions and into at least one third switch position by means of the oil from the feeding conduit 46, and in particular depending on the pressure of the oil in the feeding conduit 46, also described as operating oil and which prevails in the feeding conduit 46, and thus on the active surface 54. For example, during electric driving, in which the separable clutch 34 is open, and thus the operating piston 40 is not operated, the control slide 52 presently designed as a piston is located in the first switch position. If the separable clutch 34 is operated, whereby the pressure of the operating oil is increased for this purpose, the control slide 52 is for example displaced from the first switch position into the second switch position. By further operating the separable clutch 34 or by further increasing the pressure of the operating oil, the control slide 52 is for example displaced from the second switch position into the third switch position, in which for example the longitudinal region L2 in particular designed as a hole is for example at least partially covered for the flow volume of the cooling oil also described as cooling oil flow volume, in particular partially covered and partially released by means of the control slide 52. For example, the control slide 52 releases the longitudinal region L2 completely or more significantly in the first switch position than in the second switch position, whereby for example in the second switch position, the control slide 52 covers and thus closes a first part of the longitudinal region L2, and releases a second partial region of the longitudinal region L2. It is further conceivable that in the second switch position, the control slide 52 fluidically blocks the longitudinal region L2 (hole, in particular transverse hole), whereby the electric engine 20 and the disc pack 36 are not supplied with the cooling oil.

In particular, if the pressure of the operating oil, in particular the pressure of the operating oil acting on the active surface 54, has a first value, the control slide 52 is for example located in a first switch region, in which for example the first the first switch position is located. If, for example, the pressure of the operating oil has a larger second value in relation to the first value, then the control slide 52 is for example located in a second switch region, towards which the second switch position is located, and thus in which the second switch position is located. If, for example, the pressure of the operating oil has a larger third value in relation to the first value and in relation to the second value, then the control slide 52 is for example located in a third switch region, to which, for example, the third switch position belongs. The following can in particular be provided: The control slide 52 is for example located in the first switch region if the separable clutch 34 is open, whereby a higher flow volume of the cooling oil is set. The separable clutch 34 is for example open during electric driving or when coasting. The control slide 52 is for example located in the second switch region if K0 is opened or closed, such that the second switch region is a transition region. The control slide 52 is located in the third switch region, for example, if the separable clutch 34 is closed, whereby the flow volume of the cooling oil also described as a cooling flow volume is low. This is, for example, the case for driving controlled purely via an internal combustion engine, and in particular the case if, for example, the electric engine 20 is deactivated. This is further the case, for example, if the motor vehicle is driven by an internal combustion engine and boosted by the electric engine, the electric machine is operated by a generator and also operated in a load point shift or during recuperation. It is further conceivable, for example, that in the first switch region, a recuperation operation is carried out with K0 open, which is for example advantageous in cruising mode when an internal combustion engine is switched off to regain energy. In the second switch region, switching on, i.e., closing K0, may not or may not only be implemented, and instead, for example, the second switch region also comprises those regions around the touchpoint in which the pressure is, for example, 1 to 6 bar. At these operating points, which are often driven through in an actual driving operation, zero lubrication, i.e., if the disc pack 36 and the electric engine cease to be provided with cooling oil, is expected to minimize drag torques in the driving head and to keep hydraulic losses low, and thus to keep $CO_2$ emissions particularly low. The cooling oil flow volume is only activated where it is actually advantageous, and this is in particular the case in the first switch region and in the third switch region. The zero lubrication should be interpreted in the second switch region as an extreme value, wherein in the second switch region, the cooling oil flow volume can be clearly reduced in comparison with the first switch region and with the third switch region, but be greater than zero.

Figure 3:
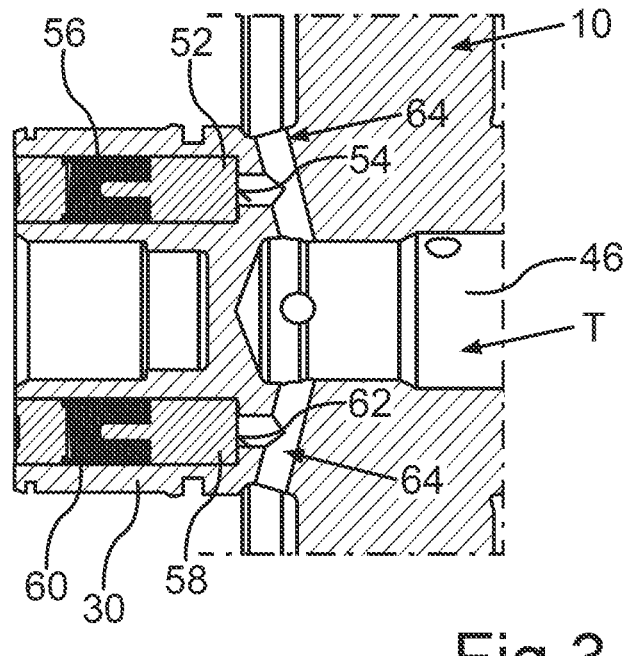
FIG. 3 shows a section of a schematic and sectional side view of a second embodiment of the hybrid drive system.

FIG. 3 shows a second embodiment of the hybrid drive system 10. In the second embodiment, the hybrid drive system 10 has a second control slide 58 provided in addition to the control slide 52, to which a second spring device 60 is assigned. The second spring device 60 is presently also designed as a mechanical spring. The present and following embodiments of the control slide 52 and of the spring device 56 can also easily be applied to the control slide 58 and the spring device 60. The spring devices 56 and 60 preferably have different spring strengths and spring characteristic curves. Thus, for example, if the operating oil acts on the control slide 52 and 58, and thus on the hydraulically effective active surface 54 of the control slide 52, and a hydraulically effective active surface 62 of the control slide 58, with the same pressure, one of the control slides 52 and 58 is moved, starting from a respective closed position, such as the first closed position, more significantly or further than the respective other control slide 58 or 52 because the spring devices 56 and 60 are of different strengths, and thus have different spring characteristic curves. The cooling oil flow volume can thus be adjusted particularly as required. It can be seen from FIG. 3 that transverse holes 64, also described as a hole or transverse boreholes, split off from a partial region T of the feeding conduit 46 and are fluidically connected to the partial region T, such that the active surfaces 54 and 62, and thus the control slides 52 and 58, can be supplied with the operating oil from the feeding conduit 46 via the transverse holes 64, to which control sides the operating oil can thus be applied, in particular directly. The control slides 52 and 58 can thus be displaced, in particular from the respective starting position. For example, via different flow cross-sections of the transverse holes 64 which can be flowed through by the operating oil and/or via different flow cross-sections of conduit parts of the cooling oil conduit 42, of which the conduit parts can for example be supplied with the cooling oil from the longitudinal region L1, for example via the control slides 52 and 58, the flow volume of the cooling oil as a whole can be adjusted as required. For example, the control slides 52 and 58 are in particular arranged in the peripheral direction of the converter hub 30, for example offset from each other by 180°. The spring devices 56 and 60 can have different spring characteristic curves and/or the active surfaces 54 and 62 are of a different size, whereby different lubricating regions, e.g., the previously specified different switch regions can advantageously be implemented. It is for example conceivable that the control slides 52 and 58 simultaneously close the conduit parts in a first state. In a second state, one of the conduit parts is for example released, whereby the other conduit part is closed, and in a third state, both conduit parts are simultaneously released for example. Thus, for example, a supply of the electric engine 20 and of the disc pack 36 with the cooling oil ceases in the first state. And in the first state, the flow volume has a first value which is larger than zero, and in a second state the flow volume has a second value which is larger than the first value and larger than zero. The previously specified zero lubrication is thus implemented in the first state, for example. Via or in the second state, the third switch region can for example be implemented, and in or via the third state, the first switch region can for example be implemented, in which the cooling oil flow volume is larger than zero, and larger than in the third switch region, in which the cooling oil flow volume is for example larger than zero, but smaller than in the first switch region, wherein in particular if zero lubrication is present in the second switch region, the cooling oil flow volume is zero in the second switch region (first state).

Figure 4:
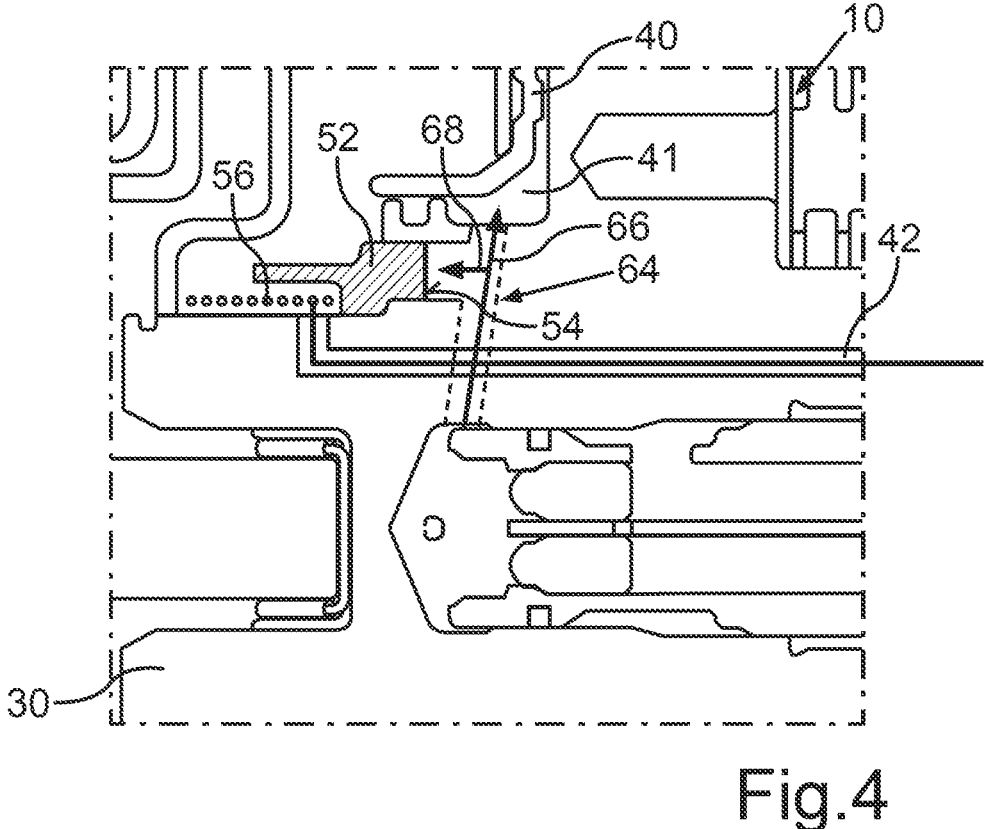
FIG. 4 shows a section of a schematic and sectional side view of a third embodiment of the hybrid drive system.

Finally, FIG. 4 shows a third embodiment of the hybrid drive system 10. The transverse hole 64 can be particularly clearly seen in FIG. 4, which transverse hole can be flowed through by the oil that can partially be used as the specified operating oil to operate the operating piston 40, and can thus be introduced into the operating chamber 41 and partially fed to the active surface 54 to apply the oil flowing through the transverse hole 64 to the active surface 54, and consequently to displace the control slide 52. The previously specified states or switch positions and switch regions can be implemented by displacing the control slide 52. The introduction of the oil flowing through the feeding conduit 46 and the transverse hole 64 into the operating chamber 41 to operate the operating piston 40 is depicted in FIG. 4 by an arrow 66. The application of the oil flowing through the transverse hole 64 to the active surface 54 is depicted in FIG. 4 by an arrow 68.

It can further be seen from FIG. 1 that the hybrid drive system 10 has a second clutch 70, which is presently designed as a wet clutch, i.e., as a wet running clutch. The second clutch 70 designed as a second disc pack has a first inner disc carrier 72, which is connected to the converter hub 30 in a manner fixed against rotation. An outer disc carrier 74 of the second clutch 70 is connected to the output drive shaft 18 in a torque-transmitting manner via a torsional vibration damper 76, such that the converter hub 30 can be connected to the output drive shaft 18 in a torque-transmitting manner by means of the second clutch 70. The second clutch 70 functions as a converter bridging clutch to bridge the torque converter 24. The second clutch 70 has a second disc pack 78 and a second operating piston 80, by means of which the second disc pack 78 can be pressed together, in order thus to close the second clutch 70. For example, the disc pack 78 of the second clutch 70 can also be supplied with oil as cooling oil from the converter interior via the cooling oil conduit 42 running into the converter hub 30. For this purpose, for example, the cooling oil conduit 42 also leads into a second clutch chamber of the second clutch 70, in the second clutch chamber of which clutch the second disc pack 78 is received

LIST OF REFERENCE CHARACTERS

10 hybrid drive system
12 axis of rotation
14 input shaft
16 housing
18 output drive shaft
20 electric engine
22 stator
23 rotor
24 torque converter
26 impeller
28 converter cover
30 converter hub
32 interior
34 separable clutch
36 disc pack

11

38 clutch chamber
40 operating piston
41 operating chamber
42 cooling oil conduit
44 arrow
46 feeding conduit
48 arrow
50 arrow
52 control slide
54 active surface
56 spring device
58 control slide
60 spring device
62 active surface
64 transverse hole
66 arrow
68 arrow
70 clutch
72 inner disc carrier
74 outer disc carrier
76 torsional vibration damper
78 disc pack
80 operating piston
L1 longitudinal region
L2 longitudinal region

The invention claimed is:

1. A hybrid drive system (10) for a motor vehicle, comprising:
   an input shaft (14) which is rotatably mounted around an axis of rotation (12) and via which torques provided by an internal combustion engine introducible into the hybrid drive system (10);
   a drive shaft (18) disposed coaxially with the input shaft (14);
   an electric engine (20) which has a stator (22) and a rotor (23);
   a torque converter (24) which has an impeller (26), a converter cover (28) connected to the impeller (26) in a manner fixed against rotation, and a converter hub (30) which is connected to the converter cover (28) in a manner fixed against rotation, wherein the converter hub is connected to the rotor (23) in a manner fixed against rotation;
   a separable clutch (34) having a disc pack (36), a clutch chamber (38) in which the disc pack (36) is received, an operating piston (40), and an associated operating chamber (41), wherein via the separable clutch (34) the converter hub (30) is connectable to the input shaft (14) in a manner fixed against rotation;
   a feeding conduit (46) which is flowable through by oil and via which at least a part of the oil flowing through the feeding conduit (46) is introducible into the operating chamber (41) as operating oil to operate the operating piston (40);
   a cooling conduit (42) via which the separable clutch (34) and the electric engine (20) are providable with a cooling oil; and
   a first control slide (52) via which a flow volume of the cooling oil is adjustable, wherein to displace the first control slide (52), and thus to adjust the flow volume, at least a part of the oil flowing through the feeding conduit (46) is appliable to a first hydraulic active surface (54) of the first control slide (52) via the feeding conduit (46);
   wherein the torque converter (24) has an interior (32) for receiving converter oil and is at least partially and directly delimited by the impeller (26);

wherein the cooling conduit (42) is a direct connecting conduit designed between the interior (32) of the torque converter (24) and the clutch chamber (38) of the separable clutch (34) and runs into the converter hub (30), wherein via the cooling conduit (42) the disc pack (36) of the separable clutch (34) and the electric engine (20) are suppliable with the converter oil from the interior (32) of the torque converter (24).

2. The hybrid drive system (10) according to claim 1, further comprising a second control slide (58) with a second hydraulic active surface (62) that is connected in parallel with the first hydraulic active surface (54) of the first control slide (52) by flow technology, wherein at least a part of the oil flowing through the feeding conduit (46) is appliable to the second hydraulic active surface (62) via the feeding conduit (46) to displace the second control slide (58) and thus to adjust the flow volume.

3. The hybrid drive system (10) according to claim 2, further comprising:
   a first spring device (56) via which the first control slide (52) is displaceable and which is assigned to the first control slide (52); and
   a second spring device (60) via which the second control slide (58) is displaceable and which is assigned to the second control slide (58);
   wherein the first spring device (56) and the second spring device (60) have different spring characteristic curves.

4. The hybrid drive system (10) according to claim 1, wherein in a first switch position of the first control slide (52) for pressures in the feeding conduit (46) lower than a pre-determined limit value, a conduit part having a large cross-section is switchable.

5. The hybrid drive system (10) according to claim 4, wherein in a second switch position of the first control slide (52) for pressures in the feeding conduit (46) lower than a pre-determined limit value and greater than a pre-determined second limit value, at least two conduit parts are switchable off.

6. A hybrid drive system (10) for a motor vehicle, comprising:
   an input shaft (14) which is rotatably mounted around an axis of rotation (12) and via which torques provided by an internal combustion engine introducible into the hybrid drive system (10);
   a drive shaft (18) disposed coaxially with the input shaft (14);
   an electric engine (20) which has a stator (22) and a rotor (23);
   a torque converter (24) which has an impeller (26), a converter cover (28) connected to the impeller (26) in a manner fixed against rotation, and a converter hub (30) which is connected to the converter cover (28) in a manner fixed against rotation, wherein the converter hub is connected to the rotor (23) in a manner fixed against rotation;
   a separable clutch (34) having a disc pack (36), a clutch chamber (38) in which the disc pack (36) is received, an operating piston (40), and an associated operating chamber (41), wherein via the separable clutch (34) the converter hub (30) is connectable to the input shaft (14) in a manner fixed against rotation;
   a feeding conduit (46) which is flowable through by oil and via which at least a part of the oil flowing through the feeding conduit (46) is introducible into the operating chamber (41) as operating oil to operate the operating piston (40);

a cooling conduit (42) via which the separable clutch (34) and the electric engine (20) are providable with a cooling oil; and a first control slide (52) via which a flow volume of the cooling oil is adjustable, wherein to displace the first control slide (52), and thus to adjust the flow volume, at least a part of the oil flowing through the feeding conduit (46) is appliable to a first hydraulic active surface (54) of the first control slide (52) via the feeding conduit (46);

wherein in a first switch position of the first control slide (52) for pressures in the feeding conduit (46) lower than a pre-determined limit value, a conduit part having a large cross-section is switchable;

wherein in a second switch position of the first control slide (52) for pressures in the feeding conduit (46) lower than a pre-determined limit value and greater than a pre-determined second limit value, at least two conduit parts are switchable off.

* * * * *